(12) United States Patent
Zuber et al.

(10) Patent No.: US 10,337,632 B2
(45) Date of Patent: Jul. 2, 2019

(54) DIAPHRAGM VALVE

(71) Applicant: GEMUE Gebr. Mueller Apparatebau GmbH & Co. Kommanditgesellschaft, Ingelfingen (DE)

(72) Inventors: Daniel Zuber, Weinsberg (DE); Michael Baumgaertner, Doerzbach (DE); Josef Bissinger, Kuenzelsau (DE)

(73) Assignee: GEMUE Gebr. Mueller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 15/683,978

(22) Filed: Aug. 23, 2017

(65) Prior Publication Data

US 2018/0195636 A1    Jul. 12, 2018

(30) Foreign Application Priority Data

Aug. 23, 2016    (DE) ........................ 10 2016 115 638

(51) Int. Cl.
| | |
|---|---|
| *F16K 7/14* | (2006.01) |
| *F16K 27/02* | (2006.01) |
| *F16K 31/122* | (2006.01) |

(52) U.S. Cl.
CPC ............ *F16K 27/0236* (2013.01); *F16K 7/14* (2013.01); *F16K 31/1221* (2013.01)

(58) Field of Classification Search
CPC ..... F16K 27/0236; F16K 7/14; F16K 31/1221
See application file for complete search history.

(56) References Cited

U.S. PATENT DOCUMENTS

| | | | |
|---|---|---|---|
| 3,978,880 A | * | 9/1976 | Crown ...................... F17B 1/12 137/315.05 |
| 4,712,575 A | | 12/1987 | Lair et al. |
| 4,840,347 A | | 6/1989 | Ariizumi et al. |
| 4,903,939 A | * | 2/1990 | Ariizumi ............ F16K 31/1221 251/63.4 |
| 6,685,164 B1 | | 2/2004 | Koizumi et al. |
| 9,322,488 B2 | | 4/2016 | Imai et al. |
| 2009/0050832 A1 | | 2/2009 | Ejiri |
| 2014/0034856 A1 | | 2/2014 | Imai et al. |

FOREIGN PATENT DOCUMENTS

| | | |
|---|---|---|
| DE | 102014004670 A1 | 10/2015 |
| DE | 102014013512 A1 | 3/2016 |
| EP | 1953436 A2 | 8/2008 |

OTHER PUBLICATIONS

European Office Action dated Jan. 31, 2018, Application No. 17184254.5-1015/3287679, pp. 1-7.

* cited by examiner

*Primary Examiner* — Eric Keasel
(74) *Attorney, Agent, or Firm* — Bond Schoeneck & King, PLLC; George McGuire (57) ABSTRACT

A diaphragm valve with a drive housing and with a drive subassembly arranged in the drive housing is proposed, for controlling a process fluid by means of a diaphragm. The diaphragm valve comprises a pretensioning subassembly for the arrangement between the drive subassembly and the diaphragm. A first spring element holds the drive subassembly in a pretensioned state before introduction into the drive housing. A second spring element holds the pretensioning subassembly in a pretensioned state before introduction into the drive housing.

14 Claims, 10 Drawing Sheets

DIAPHRAGM VALVE

CROSS-REFERENCE TO RELATED APPLICATION

The present application relates and claims priority to German Application No. 102016115638.8 filed Aug. 23, 2017, the entirety of which is hereby incorporated by reference.

BACKGROUND OF THE INVENTION

Field of the Invention

The invention relates to a diaphragm valve.

Diaphragm valves with a drive housing and with a drive subassembly arranged in the drive housing, for controlling a process fluid by means of a diaphragm, are generally known.

DE 10 2014 004 670 A1 discloses a valve with a valve housing, in which a valve seat surrounding a through-flow opening is arranged. On a housing bottom of a drive housing, a drive housing interface is provided. This enables the valve to have a valve drive component and a valve housing component, each of which can be designed as subassemblies which can be preinstalled and which can be assembled or separated from one another simply and rapidly.

EP 1 953 436 A2 discloses a diaphragm valve, the diaphragm of which is pressed in an external area onto a valve body.

SUMMARY OF THE INVENTION

Thus, the aim of the invention is to develop a diaphragm valve according to the preamble in such a manner that the replacing of the moving parts of the diaphragm valve is improved.

The aim underlying the invention is achieved by a diaphragm valve according to with a drive housing and a drive subassembly arranged in the driving housing, for controlling a process fluid by means of a diaphragm, characterized in that the diaphragm valve comprises a pretensioning subassembly for arrangement between the drive subassembly and the diaphragm, that a first spring element holds the drive subassembly in a pretensioned state before introduction into the drive housing, and that a second spring element holds the pretensioning subassembly in a pretensioned state before introduction into the drive housing.

It is proposed that the diaphragm valve comprises a pretensioning subassembly for arrangement between the drive subassembly and the diaphragm, that, before introduction into the drive housing, a first spring element holds the drive subassembly in a pretensioned state, and that, before introduction into the drive housing, a second spring element holds the pretensioning subassembly in a pretensioned state.

Thus, a rapid replacement system for a diaphragm valve is created in a simple manner, in which both the drive subassembly and also the pretensioning subassembly can be introduced in a respective pretensioned state into the drive housing. Advantageously, this diaphragm valve enables a simple and rapid replacement of the drive subassembly and of the pretensioning subassembly. The result is thus a time saving in the maintenance of the diaphragm valve, which is advantageous for applications that have a high number of switching cycles and short machine downtimes. As an example, reference is made to the bottling of beverages.

An advantageous embodiment of the diaphragm valve is characterized in that, after introduction of the drive subassembly into the drive housing, a first spring element acts as resetting spring for a control piston. Thus, the first spring element advantageously fulfills several functions. On the one hand, the first spring element establishes the pretensioned state and, after installation, can assume the function as resetting spring for the drive.

An advantageous embodiment of the diaphragm valve is characterized in that, after the introduction of the pretensioning subassembly into the drive housing, the second spring element brings about a clamping of the diaphragm between the pretensioning subassembly and a valve body. Thus, the second spring element fulfills two functions, which means that, on the one hand, the pretensioned state of the pretensioning subassembly is brought about by the second spring element before installation. On the other hand, due to the clamping of the diaphragm, which is brought about by means of the spring force of the second spring element, a sealing of the process fluid-carrying area with respect to the drive area is brought about.

An advantageous embodiment of the diaphragm valve is characterized in that the drive subassembly and the pretensioning subassembly have a smaller longitudinal extent in their respective installed state within the drive housing than in the pretensioned state. As a result, a decoupling of the pretensioning state from the installation state is achieved.

An advantageous embodiment of the diaphragm valve is characterized in that the drive housing comprises an installation opening which enables access to an installation space of the drive housing, wherein the drive subassembly in the pretensioned state and the pretensioning subassembly in the pretensioned state can be introduced via the installation opening into the installation space. Advantageously, the subassemblies are thus introduced into the drive housing via a single opening, namely the installation opening, in order to subsequently connect the drive housing to the valve body. As a result, the number of manual movements for an exchange of the subassemblies is reduced.

An advantageous embodiment of the diaphragm valve is characterized in that an internal cross section of the installation space tapers away from the installation opening, wherein, in an installed state within the drive housing, the pretensioning subassembly is supported on the tapering of the internal cross section. Advantageously, this results in lower costs for manufacturing the housing and support of the pretensioning subassembly is implemented in a simple manner.

An advantageous embodiment of the diaphragm valve is characterized in that, for introduction into the drive housing, the drive subassembly and the pretensioning subassembly are connected captively to one another. As a result, replacing the drive subassembly and the pretensioning subassembly is further simplified, which further reduces the number of manual movements needed for replacing the subassemblies.

An advantageous alternative embodiment of the diaphragm valve is characterized in that the drive housing comprises a first installation opening which is oriented away from the valve body and enables access to a first installation space section of the drive housing, wherein the drive housing comprises a second installation opening oriented toward the valve body, which enables access to a second installation space section of the drive housing, wherein, in the pretensioned state, the drive subassembly can be introduced via the first installation opening into the first installation space section, wherein, in the pretensioned state, the pretensioning subassembly can be introduced via the second installation opening into the second installation space section, and wherein the first and second installation space sections are connected by means of a passage opening, through which a valve spindle is guided. Advantageously, the subassemblies can be replaced separately from one another in this manner. Moreover, this results in decoupling of the drive from the pretensioning subassembly. In particular, a drive can be designed to be stronger, since, for example, a drive cylinder cross section can be designed to be enlarged in comparison to the cross section of the second installation space section.

An advantageous embodiment of the diaphragm valve is characterized in that the valve spindle which is connected to a control piston of the drive subassembly is connected, guided by the pretensioning subassembly, to the diaphragm, wherein the pretensioning subassembly comprises a slide bearing, in which the valve spindle is guided. By means of the slide bearings, a centrally arranged guiding of the valve spindle is created, which improves the guiding of the valve spindle in a switching cycle.

An advantageous embodiment of the diaphragm valve is characterized in that the pretensioning subassembly and the valve body engage in one another in such a manner that a rotation of the pretensioning subassembly with respect to the valve body about a feed axis is prevented. As a result, the rotational forces acting on the diaphragm are reduced, which increases the useful life of the diaphragm.

An advantageous embodiment of the diaphragm valve is characterized in that the drive housing comprises a first thread facing the valve body, wherein the valve body has a second thread corresponding to the first thread. By means of threads that engage in one another in this manner, the connection between the drive housing and the valve body can occur in a simple manner by screwing in. The number of manual movements for the installation of the diaphragm valve is reduced.

An advantageous development is characterized in that the first thread and/or the second thread is/are designed to be two-start or four-start. In particular, due to the multi-start design of the thread, a position of laterally arranged control fluid connections can be defined. In the case of a four-start thread, a positioning of the control air connections in 90° increments is thus achieved. In the case of a two-start thread, on the other hand, the result is 180° increments.

An advantageous embodiment of the diaphragm valve is characterized in that the drive subassembly comprises the control piston and the valve spindle which is firmly connected to the control piston, wherein the control piston is supported by means of the first spring element, which is under pressure, on a spring plate, wherein the valve spindle is passed through a passage opening of the spring plate, wherein, on the side of the passage opening facing away from the control piston, the valve spindle has a first abutment area, and wherein, in the pretensioned state of the drive subassembly, a second abutment area of the spring plate, in collaboration with the first abutment area of the valve spindle, limits movement of the control piston away from the valve plate. Advantageously, by means of the abutment areas, a captive arrangement of the elements of the drive subassembly is provided.

An advantageous embodiment of the diaphragm valve is characterized in that the pretensioned pretensioning subassembly comprises a counter-bearing section and a clamping section with a clamping area for clamping the diaphragm, wherein the clamping section is supported by means of the second spring element, which is under pressure, on the counter-bearing section, wherein the clamping section is passed in sections through a passage opening of the counter-bearing section, wherein, on a side facing away from the clamping area, the clamping section has a third abutment area, and wherein, in the pretensioned state of the pretensioning subassembly, a fourth abutment area of the counter-bearing section, in collaboration with the third abutment area of the clamping section, limits movement of the clamping section away from the counter-bearing section. Advantageously, by means of the abutment areas, a captive arrangement of the elements of the pretensioning subassembly is provided.

BRIEF DESCRIPTION OF THE DRAWINGS

Additional features, application possibilities and advantages of the invention result from the following description of embodiment examples of the invention, which are represented in the figures of the drawing. For functionally equivalent sizes and features, the same reference numerals are also used in all the figures for different embodiments. In the drawing, the figures show.

DETAILED DESCRIPTION

Figure 1:
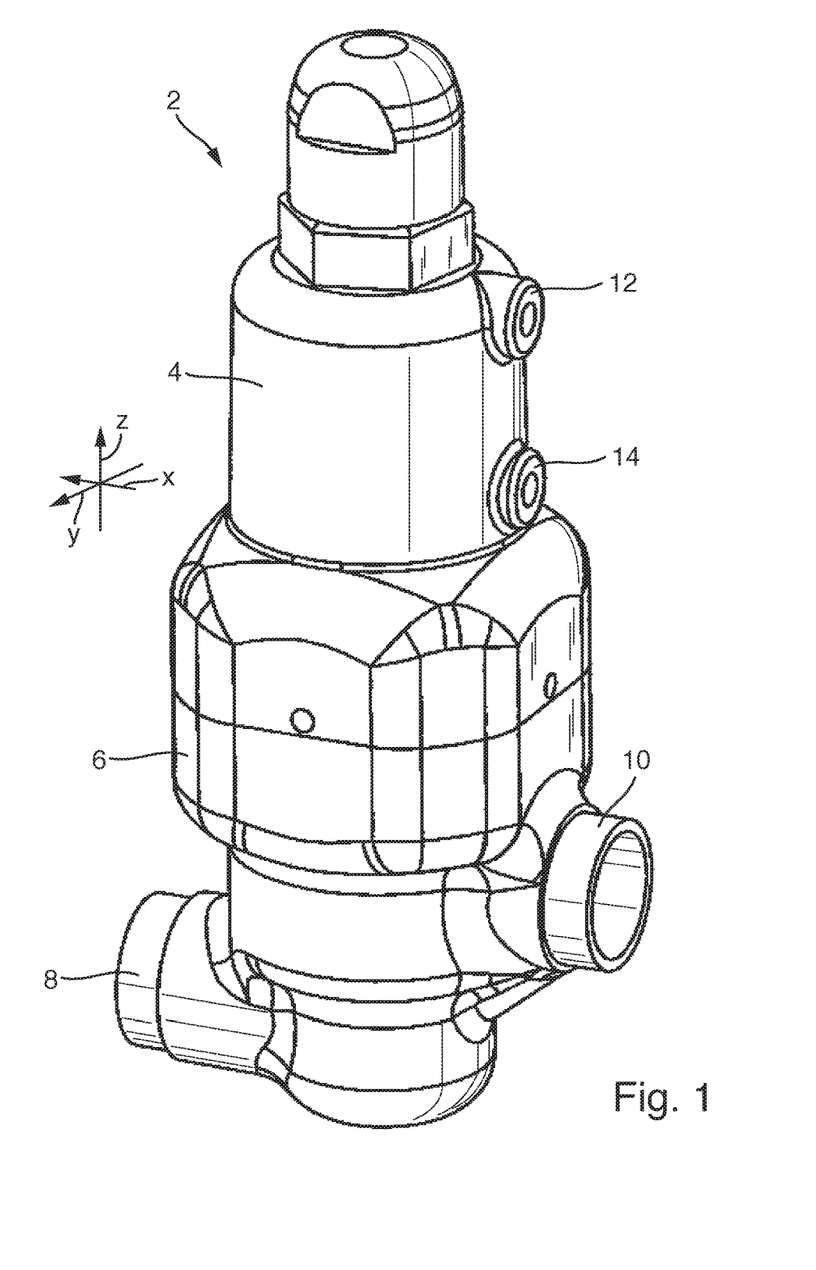
FIG. 1 in a diagrammatic perspective view, a diaphragm valve.

FIG. 1 shows, in a diagrammatic perspective view, a diaphragm valve 2, in which a drive housing 4 is arranged on a valve body 6. The valve body 6 comprises two process fluid connections 8 and 10, through which the process fluid to be supplied can be fed or discharged. Moreover, the valve body 6 comprises a control opening, not shown, for the arrangement of a diaphragm by means of which the process fluid is controlled. The drive housing 4 comprises two work-fluid connections 12 and 14, by means of which a drive, not shown in FIG. 1, is supplied with work fluid, in order to control the diaphragm.

Figure 2:
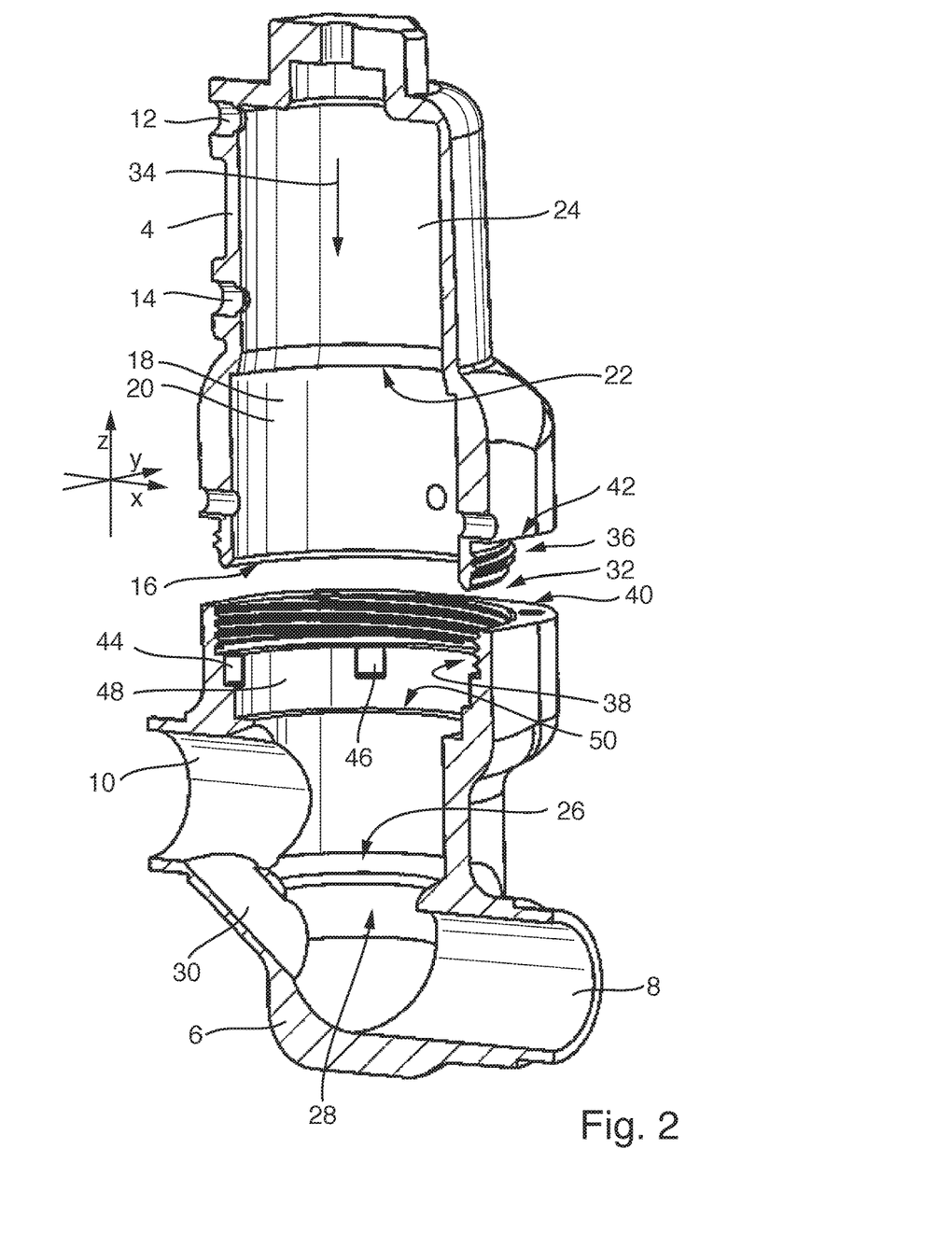
FIG. 2 in a central diagrammatic cross section, a drive housing and a valve body of the diaphragm valve.

FIG. 2 shows, in a central diagrammatic cross section along an xz plane, the drive housing 4 and the valve body 6 of the diaphragm valve 2. The drive housing 4 comprises an installation opening 16, which enables access to an installation space 18, provided that the drive housing 4 is removed from the valve body 6. The installation space 18 comprises a pretensioning section 20, wherein, after a tapering 22 of the internal cross section of the installation space 18, the pretensioning section 20 transitions into a drive section 24. The drive section 24 is connected to the work-fluid connections 12 and 14.

The valve body 6 comprises a valve seat 26, which is used for application of the diaphragm and for closing of the valve seat opening 28. Moreover, a bypass channel 30 is shown, through which the process fluid can also flow when the valve seat opening 28 is closed. Naturally, the valve body 6 can also be formed without bypass channel 30. Moreover, the valve body 6 comprises the control opening 32, through which the diaphragm is introduced into the valve body 6 during installation of the diaphragm valve 2.

The drive housing 4 comprises, in a feed direction 34, an external thread 36 which can be screwed into an internal thread 38 of the valve body 6. The feed direction 34 points in the direction of the valve seat 26 and extends along a feed axis extending along the feed direction through the diaphragm valve 2. The external thread 36 and the inner thread 38 are preferably multi-start threads which, together with abutments 40 and 42, define a position of the drive housing 4 with respect to the valve body 6 in a screwed-in state. Naturally, the drive housing 4 can also comprise an internal thread and the valve body 6 can comprise an external thread corresponding to the internal thread.

Preferably, as shown in FIG. 2, a four-start self-locking metric internal thread 38 and a four-start self-locking metric external thread 36 are used, having, for example, the properties M42×Ph6×P 1.5 (lead 6, pitch 1.5). In the case of a self-locking thread, a friction angle is greater than the lead angle. Naturally, a trapezoidal thread can also be used, which has improved mobility. Alternatively to the four-start embodiments of the external thread 36 and of the internal thread 38, the respective threads can also be designed to be two-start. Alternatively, it is also possible to provide a single-start design for the external thread 36 and the internal thread 38.

Alternatively or additionally to the internal thread 38 and the external thread 36, the valve body 6 can comprise thread bores and the drive housing 4 can comprise passage bores. By means of the thread bores and the passage bores, respective screws can be screwed, guided by the passage bores, into the thread bores of the valve body 6, in order to fix the drive housing 4 with respect to the valve body 6.

Parallel to the feed direction 34, adjoining the internal thread 38, grooves 44 and 46 extend, which form a torque-proof arrangement, as explained below in FIG. 5. An installation space 48 of the valve body 6 comprises, in the feed direction 34, a clamping area 50 for clamping the diaphragm.

Figure 3:
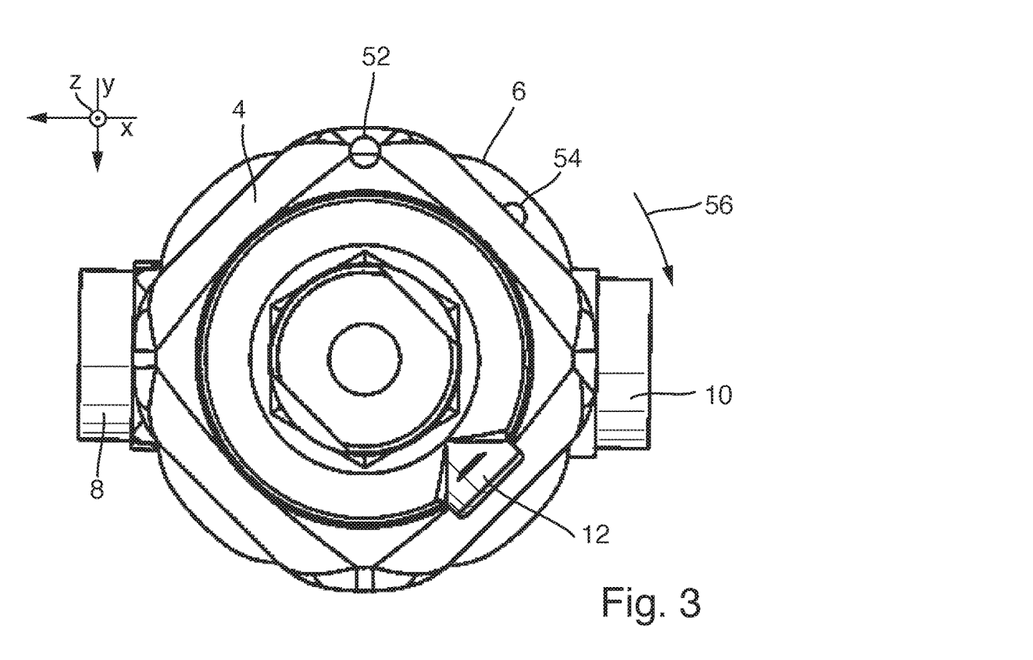
FIG. 3 in a diagrammatic top view, an embodiment of the diaphragm valve.

FIG. 3 shows, in a diagrammatic top view opposite a z-direction, an embodiment of the diaphragm valve 2. The drive housing 4 comprises a passage bore 52 extending parallel to the feed direction 34. The valve body 6 comprises a blind hole 54. From the position shown in FIG. 3, the drive housing 4 is rotated in the direction of arrow 56 by 45° with respect to the valve body 6, so that the threads of the drive housing 4 and of the valve body 6, which correspond to one another, are screwed into one another and the passage bore 52 lies over the blind hole 54 so as to define a position of the drive housing 4 with respect to the valve body 6 by means of a bolt guided through the passage bore 52 and engaging in the blind hole 54. In a terminal position, the work-fluid connection 12 points in the y-direction.

Figure 4:
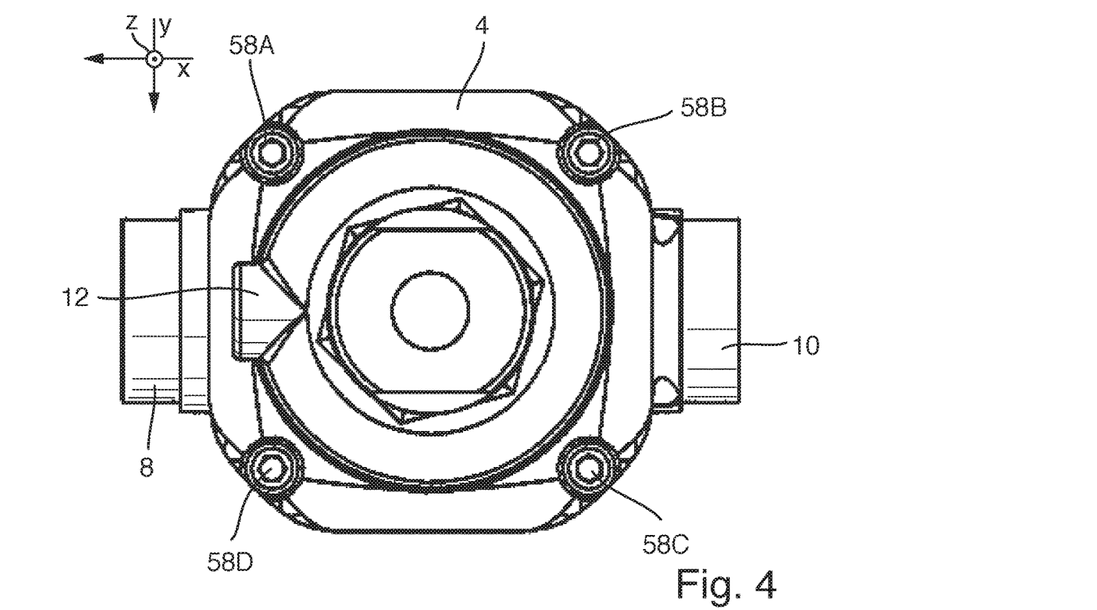
FIG. 4 in a diagrammatic top view, an embodiment of the diaphragm valve.

FIG. 4 shows, in a diagrammatic top view opposite a z-direction, an embodiment of the diaphragm valve 2. In contrast to FIG. 3, it is shown in FIG. 4 that screws 58A to 58D, guided by the passage bores of the valve body 4, engage in corresponding internal threads of the valve body 6 and thereby fix the drive body 4 with respect to the valve body 6. The work-fluid connection 12 points in the x-direction.

Figure 5:
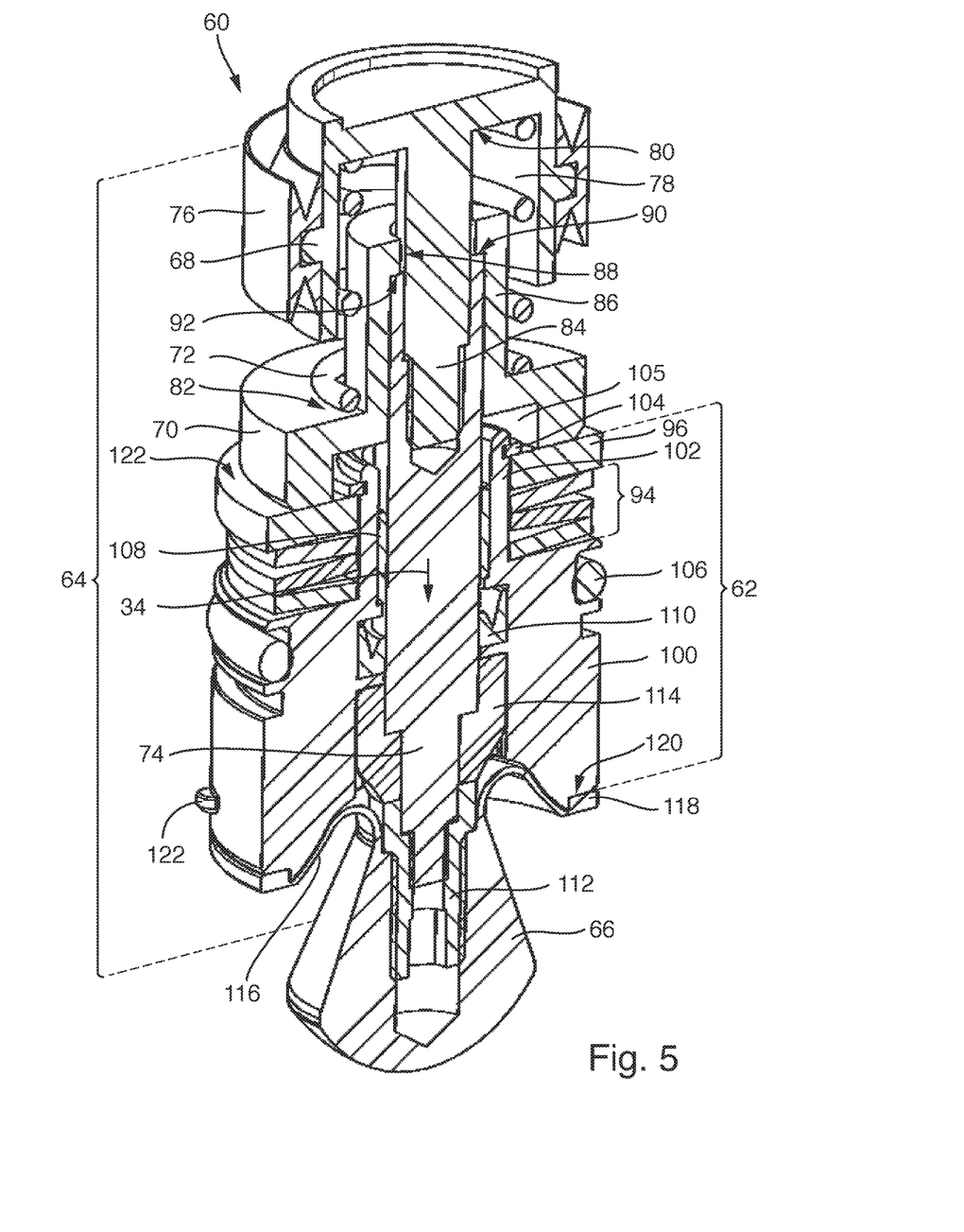
FIG. 5 in a diagrammatic perspective cross-sectional view, a subassembly.

FIG. 5 shows, in a diagrammatic perspective cross-sectional view, a subassembly 60 in a pretensioned state. The subassembly 60 comprises a pretensioning subassembly 62, a drive subassembly 64 and the diaphragm 66. The drive subassembly 64 comprises a control piston 68, a spring plate 70, a first spring element 72 arranged between spring plate 70 and control piston 68, and a valve spindle 74. The first spring element 72 is designed as a spiral compression spring. On the peripheral side, the control piston 68 comprises a sealing element 76. The control piston 68 comprises an internal spring space 78 in which the first spring element 72 is arranged. Moreover, the control piston 68 provides an application section 80 for application of the first spring element 72. In the same way, the spring plate 70 provides an application area 82 for the first spring element 72. The first spring element 72 is under pressure and has the effect that the control piston 68 and the spring plate 70 are pressed away from one another.

The valve spindle 74 is firmly connected to the control piston 68 by means of a spindle section 84 protruding from the control piston 68. The spring plate 70 comprises a protruding cylindrical section 86 dipping into the spring space 78. The valve spindle 74 by means of the spindle section 84 is guided through a central passage opening 88 of the spring plate 70. The valve spindle 74 comprises a first abutment area 90, which is arranged on a side of the passage opening 88 facing away from the spring space 78. A second abutment area 92 is provided by means of an internal cross section enlargement of the section 86 starting from the passage opening 88. In the represented pretensioned state of the drive subassembly 64, the two abutment areas 90 and 92 bring about a limitation of movement of the spring plate 70 and of the control piston 68 away from one another. In the pretensioned state, the spring plate 70 and the control piston 68 or the spindle section 84 adjoin one another via the abutment areas 90 and 92.

The pretensioning subassembly 62 is also shown in a pretensioned state and comprises a second spring element 94 which is under pressure and designed as spring plate packet comprising three plate springs. The second spring element 94 is arranged between a counter-bearing section 96 and a clamping section 100. A cylindrical section 102 of the clamping section 100 protrudes through the second spring element 94 and the counter-bearing section 96. The section 102 comprises, on the distal end thereof, an annular groove arranged on the periphery thereof, into which a ring 104 is introduced. The ring 104 has the effect that the counter-bearing section 96 which is pressed by means of the second spring element 94, which is under pressure, opposite a feed direction 34, can be supported by means of the ring 104 on the clamping section 100. The clamping section 100 comprises a third abutment area by means of the ring 104. The counter-bearing section 96 forms radially inward a fourth abutment area. By means of the third and fourth abutment areas, movement of the clamping section 100 away from the counter-bearing section 96 is limited. In the present case, the pretensioned state of the pretensioning section 62 is shown, in which the counter-bearing section 96 is applied against the ring 104. The section 102, by means of the distal end thereof, protrudes into a reception space 105 of the spring plate 70.

In a peripheral groove of the clamping section 100, an O-ring 106 is arranged, which consists of PTFE, for example, and provides a seal with a housing inner wall. Within the section 102, a slide bearing 108 is arranged, in which the valve spindle 74 is guided. In the feed direction 34, a sealing ring 110, arranged on an inner groove of the clamping section 100, adjoins the slide bearing 108.

On the side of the subassembly 60 facing away from the control piston 68, the diaphragm 66 is arranged. The contact element 112 is screwed into the diaphragm 66. The valve spindle 74 in turn is screwed into the contact element 112. Thus, a force originating from the control piston 68 can be transmitted by means of the contact element 112 onto the diaphragm 66. Between the contact element 112 and the valve spindle 74, a torque-proof arrangement 114 is provided, which engages by means of protrusions, which are not shown, in longitudinal grooves of the clamping section 100, which extend parallel to the feed direction 34.

The diaphragm 66 consists of PTFE, for example, and transitions from a central section into a sealing section 116 of thinner design, which can be moved during operation and which transitions radially outwardly into a fastening section 118. The fastening section 118 is clamped between a clamping area 120 of the clamping section 100 and the clamping area 50 of the valve body 6. The central section is pressed onto the valve seat 26 by means of the valve spindle 74 in order to close the valve seat opening 28.

A protrusion 122, which protrudes on the peripheral side from the clamping section 100, is provided for engagement in one of the grooves 44 and 46, in order to prevent or limit rotation of the clamping section 100 with respect to the valve body 6. Thus, there is a torque-proof arrangement between the valve body 6 and the clamping section 100. The torque-proof arrangement 114 prevents or limits rotation of the valve spindle 74 with respect to the clamping section 100 about a feed axis. Thus, the subassembly 60 ensures that all the components of the subassembly 60 remain arranged in a substantially torque-proof manner with respect to the diaphragm 66. In particular, when a drive housing 4 is screwed into the valve body 6 with the subassembly 60 introduced into the installation space 18, then the friction between the fastening section 118 and the clamping area 50 is minimized. This contributes to the diaphragm 66 not being damaged during the installation of the subassembly 60.

The subassembly 60 can be introduced in the pretensioned state through the installation opening 16 of the drive housing 4 into the installation space 18. After introduction into the installation space 18, the counter-bearing section 96 is applied by means of the surface 122 thereof against the tapering 22. After the subassembly 60 has been introduced into the installation space 18, the drive housing 4 can be connected to the valve body 6.

In the represented pretensioned state of the subassembly 60, the first spring element 72 presses the spring plate 70 onto the counter-bearing section 96. The first spring element 72 presses the control piston 68 opposite the feed direction 34 and thus also presses the valve spindle 74 opposite the feed direction 34. By means of the contact element 112 and the torque-proof arrangement 114, the spring force of the first spring element 72 is transmitted to the clamping section 100. The clamping section 100 in turn presses against the second spring element 94. The forces of the spring elements 72 and 94 as well as the geometric dimensions of the drive subassembly 64 and of the pretensioning subassembly 62 are adjusted to one another in such a manner that, in the pretensioned state of the subassembly 60, the first abutment area is applied against the second abutment area, and the third abutment area is applied against the fourth abutment area. In the pretensioned state, all the parts of the subassembly 60 are fastened captively to one another.

Figure 6:
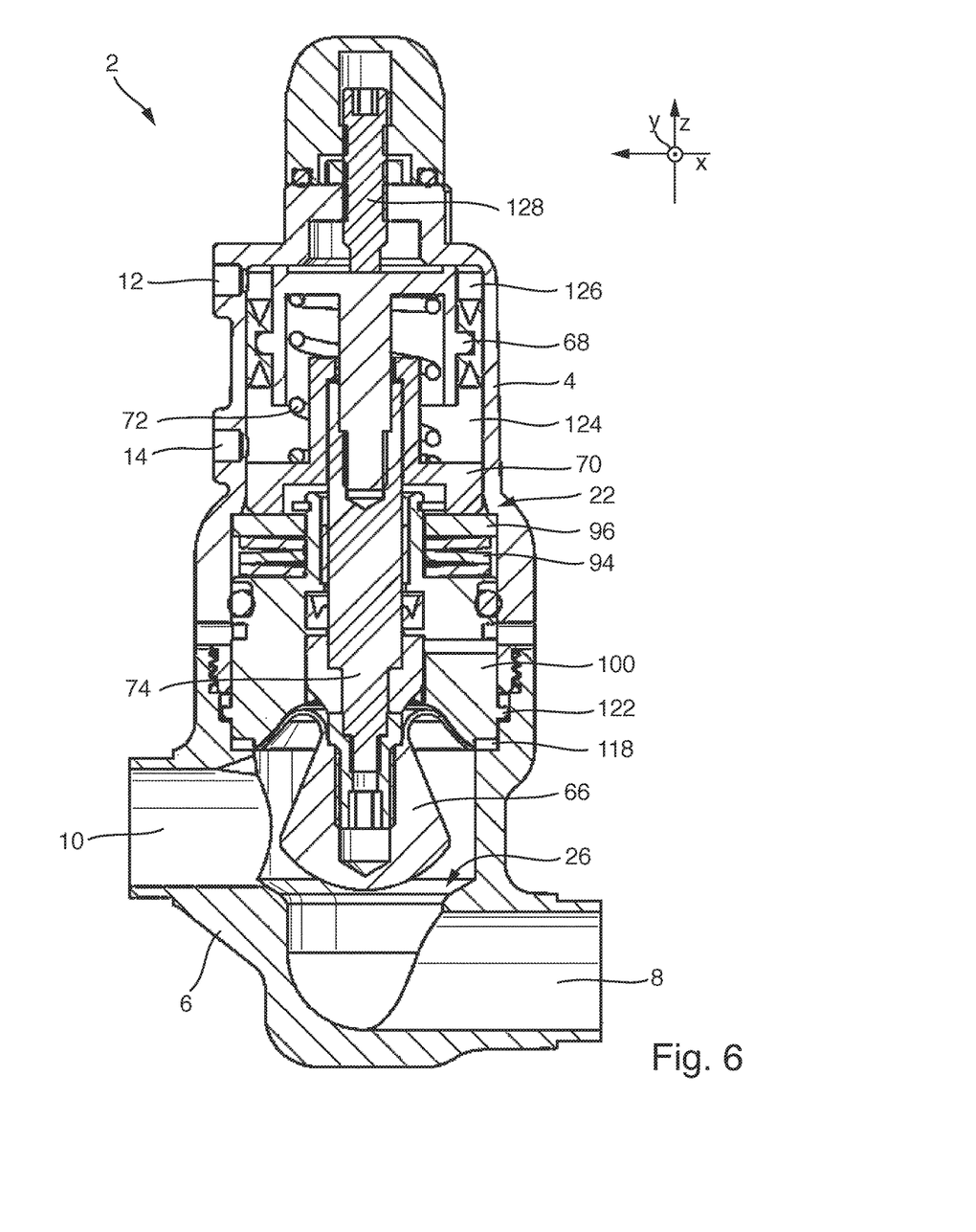
FIG. 6 a diagrammatic cross-sectional view of the diaphragm valve.

FIG. 6 shows a diagrammatic cross-sectional view of the diaphragm valve 2, wherein the subassembly 60 is arranged within the drive housing 4 and within the valve body 6. The control piston 68 subdivides the drive section 24 of the drive housing 4 into two variable volumes 124 and 126. The volumes 124 and 126 can be exposed to work fluid via the work-fluid connections 14 and 12.

A screw 128 is screwed at the distal end of the drive housing 4 into a central internal thread of the drive housing 4. The screw 128 provides a stroke limitation for the control piston 68, wherein a total stroke is adjusted by screwing the screw 128 into the internal thread of the drive housing 4.

In the installed state, the first and the second abutment areas of the drive subassembly 64 are not applied against one another. In the installed state, the third and the fourth abutment areas of the pretensioning subassembly 62 are not applied against one another.

Figure 7:
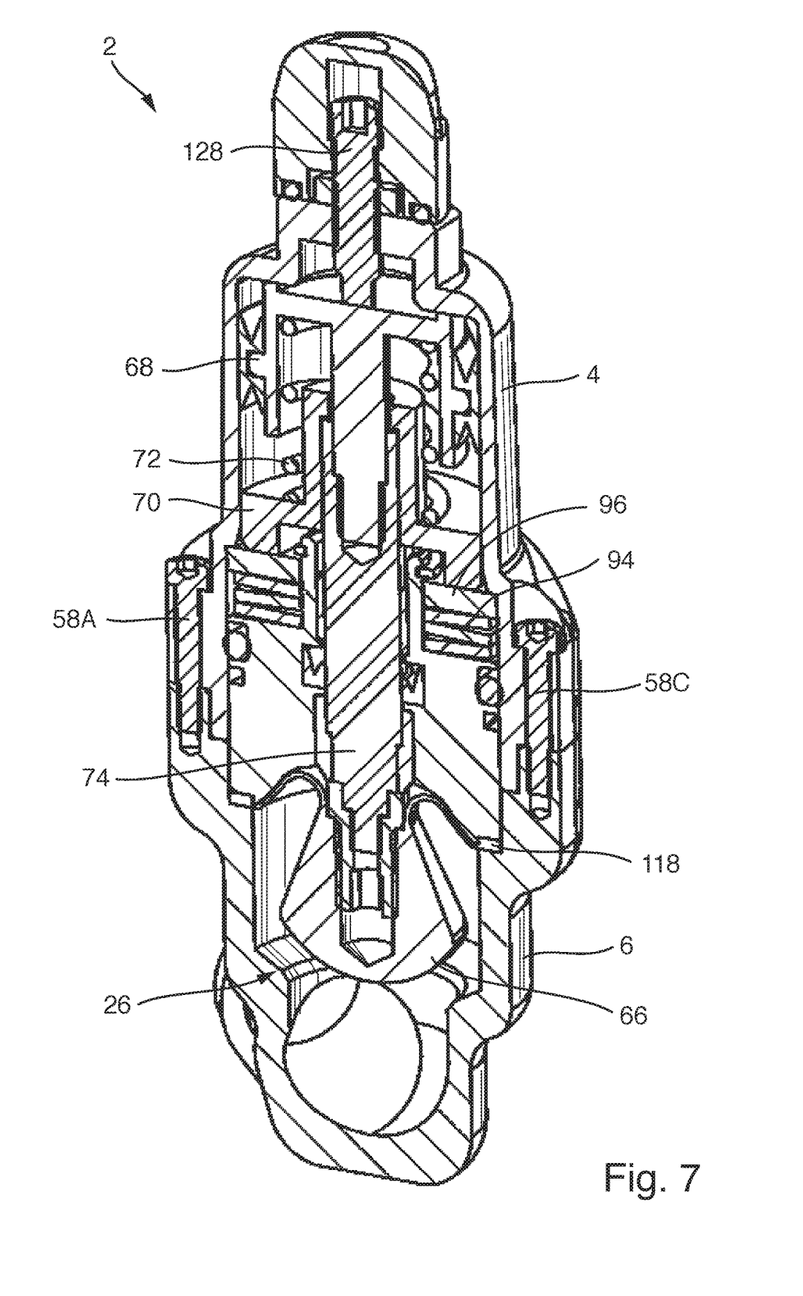
FIG. 7 the diaphragm valve, in a perspective diagrammatic cross-sectional view.

FIG. 7 shows the diaphragm valve 2 in a perspective diagrammatic cross-sectional view. Alternatively to the screw connection of drive housing 4 and valve body 6 shown in FIG. 6, the fastening variant according to FIG. 4 is shown, in which screws 58 are used for connecting the drive housing 4 to the valve body 6.

Figure 8:
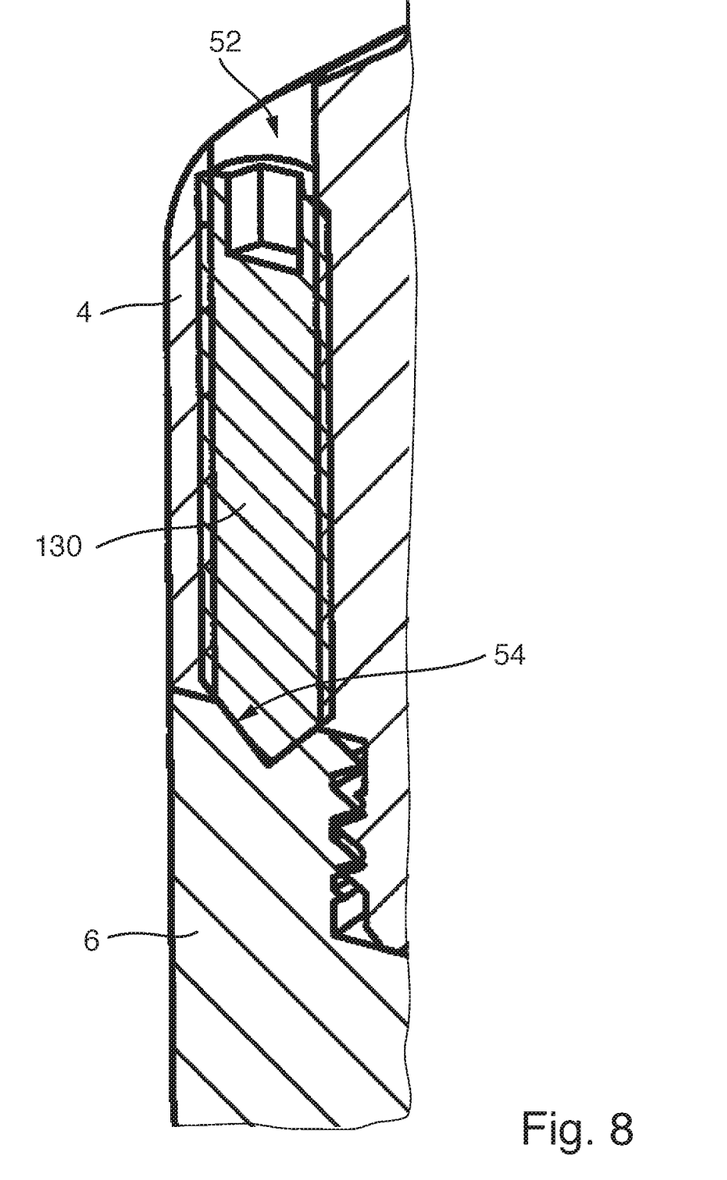
FIG. 8 a diagrammatic cross-sectional view of a detail according to the embodiment of the diaphragm valve according to FIG. 3.

FIG. 8 shows a diagrammatic cross-sectional view of a detail according to the embodiment of the diaphragm valve 2 according to FIG. 3. The passage bore 52 of the drive housing 4 comprises an inner thread, into which the screw 130 is screwed. The screw 130 engages in the blind hole 54 of the valve body 6 and thus provides a protection against accidental unscrewing of the drive body 4.

Figure 9:
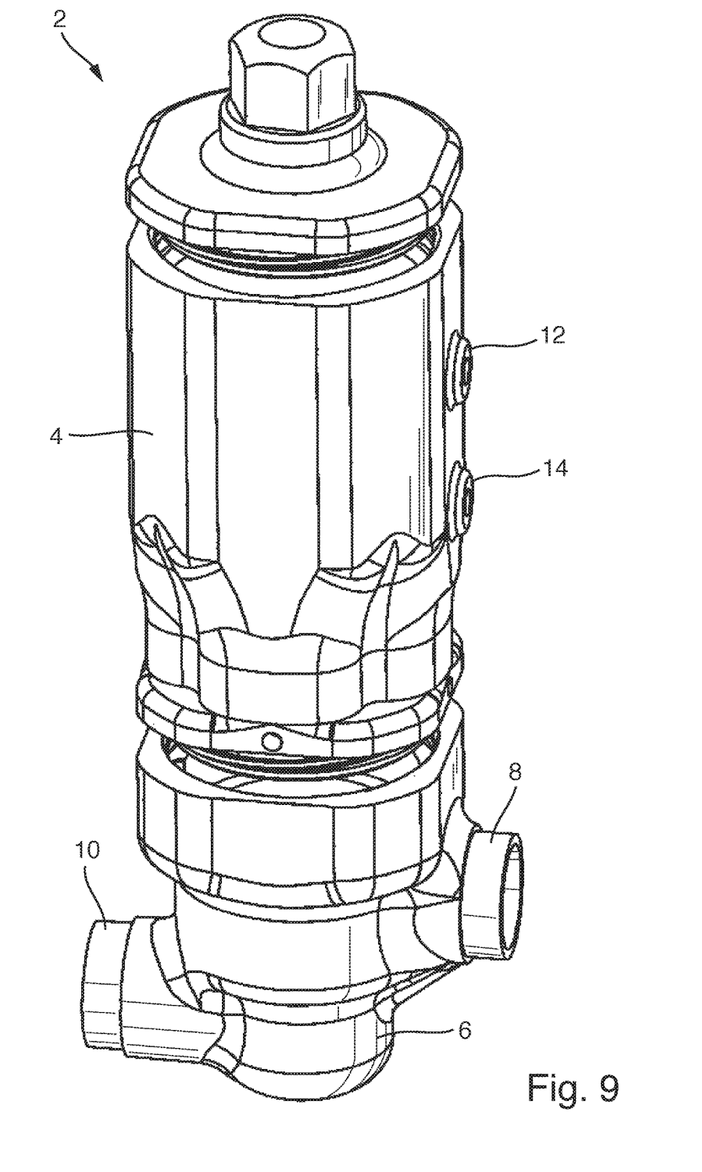
FIG. 9 an additional embodiment of the diaphragm valve, in a perspective view.

FIG. 9 shows an additional embodiment of the diaphragm valve 2 in a perspective view.

Figure 10:
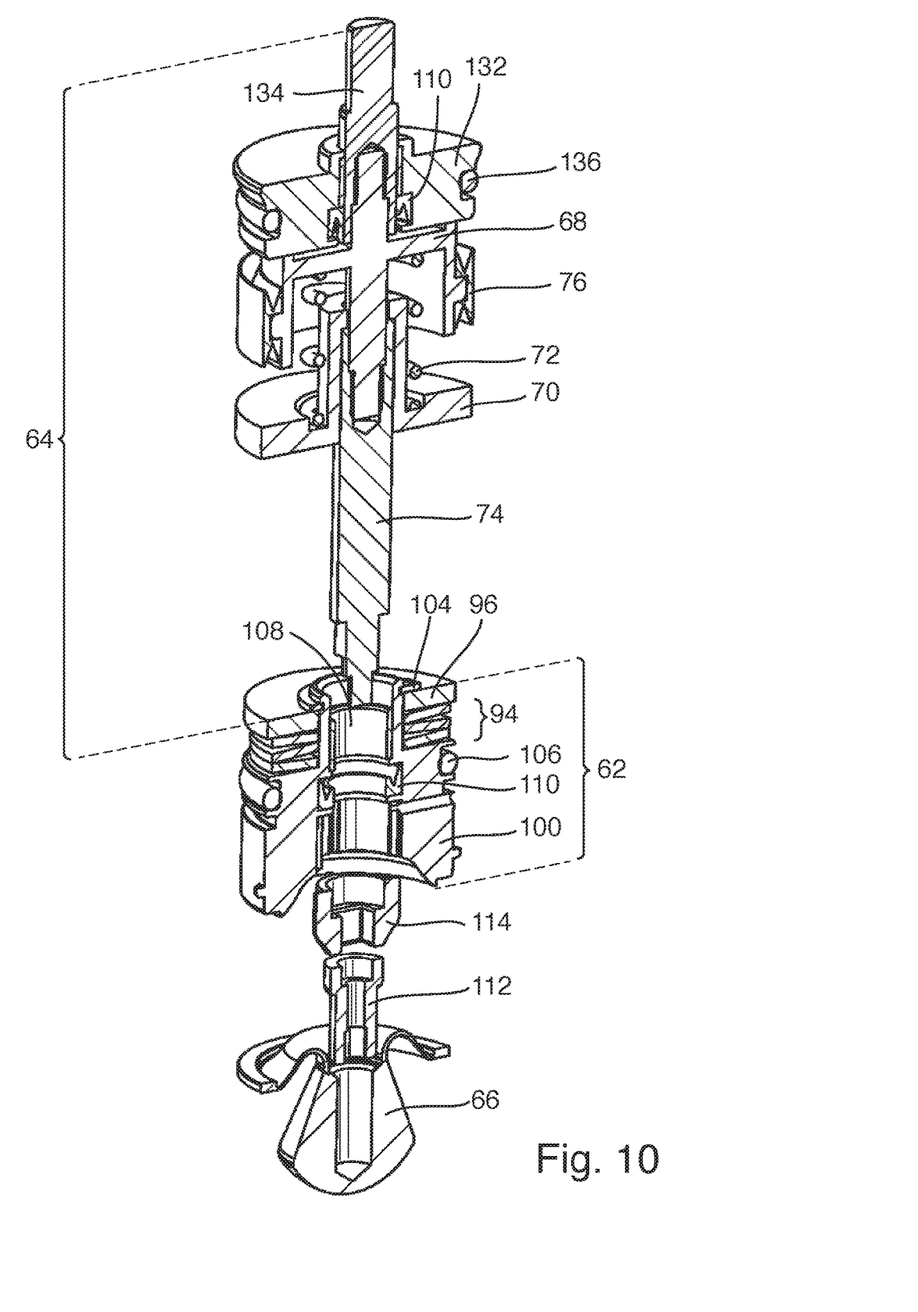
FIG. 10 in a diagrammatic exploded cross-sectional view, the drive subassembly and the pretensioning subassembly.

FIG. 10 shows, in a diagrammatic exploded cross-sectional view, the drive subassembly 64, the pretensioning subassembly 62, the torque-proof arrangement 114, the contact element 112, and the diaphragm 66 for arrangement in the diaphragm valve 2 according to FIG. 9. The drive subassembly 64 and the pretensioning subassembly 62 are also in the respective pretensioned state thereof separately from one another. Regarding the basic structure of the drive subassembly 64 and of the pretensioning subassembly 62, reference is made the description pertaining FIG. 5.

The drive subassembly 64 of FIG. 10 differs from the drive subassembly 64 of FIG. 5 in that a cover 132 is arranged opposite the feed direction 34 through which a spindle section 134, which faces away from the valve spindle 74, is guided, and which is firmly connected to the control piston 68. Toward the exterior, an additional O-ring 136 seals the cover 132 with respect to a housing internal wall of the drive housing 4. Towards the interior, a sealing ring 110 seals the spindle section 134 with respect to the cover 132.

Figure 11:
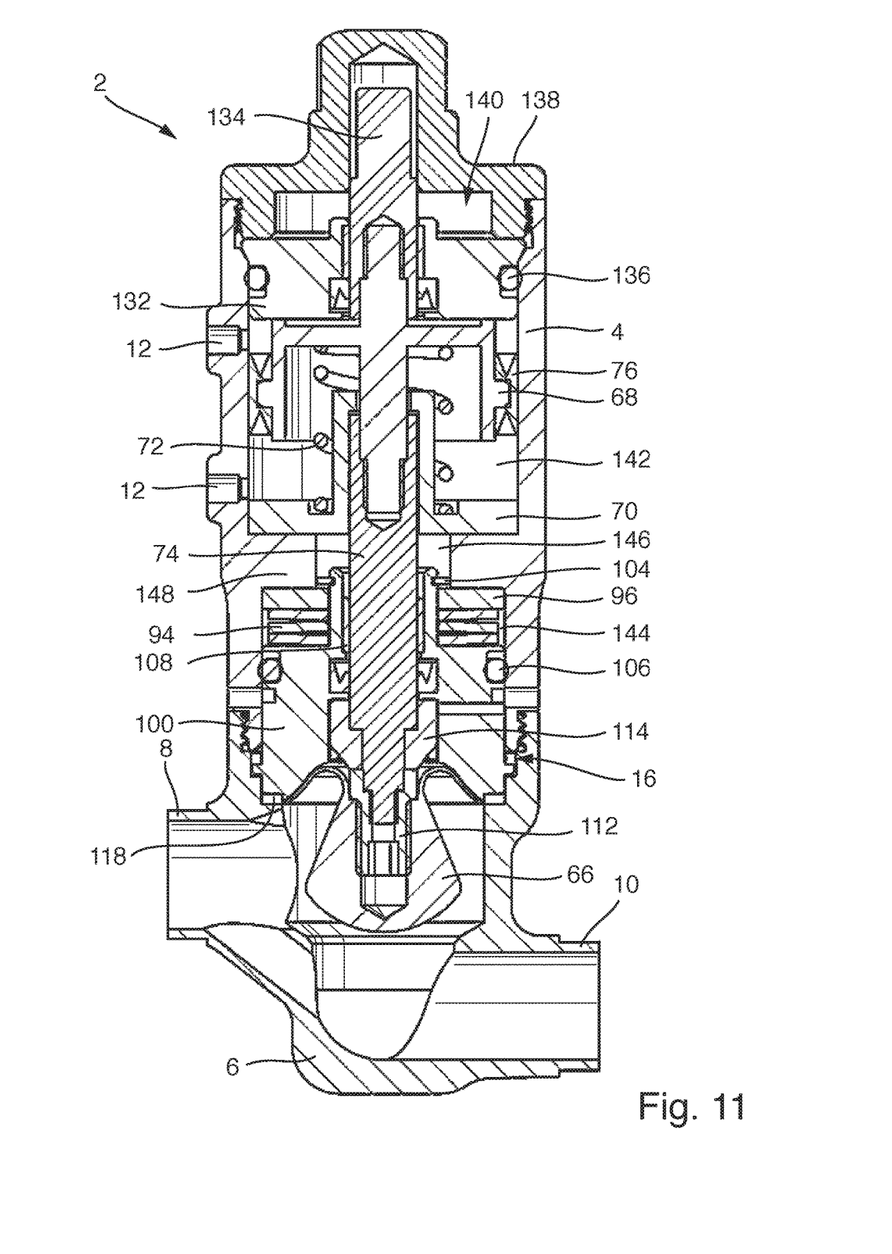
FIG. 11 the diaphragm valve, in a diagrammatic cross-sectional view according to the embodiment of FIGS. 9 and 10.

FIG. 11 shows the diaphragm valve 2 in a diagrammatic cross-sectional view according to the embodiment of FIGS. 9 and 10. The drive housing 4 is closed with a closing cover 138 which is screwed into an internal thread of the drive housing 4. When the closing cover 138 is taken off, the drive housing 4 uncovers a first installation opening 140 oriented away from the valve body 6. Via the first installation opening 140, the drive subassembly 64 can be introduced into a first installation space section 142. After introduction of the drive subassembly 64 into the first installation space section 142, the first installation space section 142 can be closed with the closing cover 138. The installation cover 138 fixes the cover 132 with respect to the drive housing 4.

The second installation opening 16 enables access to a second installation space section 144 in which the pretensioning subassembly 62 is arranged. A passage opening 146 connects the installation space sections 142 and 144. The passage opening 146 has a smaller diameter than the two installation space sections 142 and 144. The valve spindle 74 is guided through the passage opening 146. The passage opening 146 leads through a partition 148 which separates the two installation space sections 142 and 144 from one another.

During installation of the diaphragm valve 2 according to FIG. 11, the drive subassembly 64 is preferably first arranged in the pretensioned state thereof in the first installation space section 142. After the application of the closing cover 138, the drive subassembly 64 is transferred into the installed state. In the process, the valve spindle 174 already protrudes into and through the second installation space section 144. Subsequently, the pretensioning subassembly 64 is guided into the second installation space section 144 and over the valve spindle 74. The torque-proof arrangement 114 is subsequently introduced into the clamping section 100. Subsequently, the contact element 112 is connected to the valve spindle 74. Then, the diaphragm 66 is connected to the contact element 112. In this way, both the drive subassembly 64 and also the pretensioning subassembly 62 are arranged in the drive housing 4. The pretensioning subassembly 62 is still in the pretensioned state.

After the arrangement of the drive subassembly 64 and the pretensioning subassembly 62 in the drive housing 4, the drive housing 4 is connected to the valve body 6. As a result of the fact that the fastening section 118 of the diaphragm 66 is arranged between the clamping section 100 or the clamping area 120 and the clamping area 50, during the arrangement of the drive housing 4 on the valve body 6, the pretensioning subassembly 62 transitions from the pretensioned state into the installed state, which means that the third and the fourth abutment areas are not in contact with one another in the installed state.

In the installed state of the diaphragm valve 2 in FIG. 11, a portion of the first installation space 142 forms a lifting cylinder for the control piston 68. In the installed state of the diaphragm valve 2, the first spring element 72 brings about a resetting of the control piston 68 into the position shown. Therefore, the first spring element 72 can also be referred to as resetting spring. The movement of the control piston 68 is limited opposite the feed direction 34 by the cover 132. In the feed direction 34, the movement of the control piston 68 is limited by the spring plate 70. The drive subassembly 64 is clamped between the partition 148 and the closing cover 138.

In the installed state, the counter-bearing section 96 is supported on the partition 148. The counter-bearing section 96 is thus fixed opposite the feed direction 34 with respect to the drive housing 4. Due to the fixing of the drive housing 4 with respect to the valve body 6, the counter-bearing section 96 is also fixed with respect to the valve body 6 and, in particular, with respect to the clamping area 50. The second spring element 94 is thus supported on the counter-bearing section 96 which is fixed with respect to the valve body 6, and presses the clamping section 100 in a clamping area 120 onto the fastening section 118, in order thereby to clamp the fastening section 118 of the diaphragm 66 in a fluid-tight manner. In the installed state, the pretensioning subassembly 62 is clamped between the partition 148 and the clamping area 50 of the valve body 6.

In the installed state, the spring plate 70 is supported on the side of the partition 148 oriented toward the installation space section 142. In the installed state, the counter-bearing section 96 is applied against the side of the partition 148 facing the second installation space section 144.

In contrast to the embodiment of the diaphragm valve 2 in FIG. 6, the partition 148 in FIG. 11 is arranged between the drive subassembly 64 and the pretensioning subassembly 62. The partition 148 enables a decoupling of the installation space sections 142 and 144 to the effect that a respective different cross section can be provided. By means of a cross section enlargement of the piston space in the first installation space section 142 in comparison to the cross section of the second installation space section 144, this enables a stronger design of the drive.

The invention claimed is:

1. A diaphragm valve for controlling a process fluid by means of a diaphragm, the diaphragm valve comprising:
   the diaphragm;
   a drive housing;
   a drive subassembly constructed in a first state external to the drive housing and comprising a first spring element structurally retaining the drive subassembly in a pretensioned state while in the first state, and in a second state the drive subassembly is arranged within the drive housing with the first spring element structurally maintaining the drive subassembly in a pretensioned state; and
   a pretensioning subassembly constructed in a first state external to the drive housing and comprising a second spring element structurally retaining the pretensioning subassembly in a pretensioned state while in the first state, and in a second state the pretensioning subassembly is positioned between the drive subassembly and the diaphragm.

2. The diaphragm valve according to claim 1, wherein the drive subassembly further comprises a control piston and when the drive subassembly is in its second state, the first spring element acts as resetting spring for the control piston.

3. The diaphragm valve according to claim 1, further comprising a valve body and wherein, when the pretensioning subassembly is in its second state, the diaphragm is clamped between the pretensioning subassembly and the valve body by applying a clamping force by means of the second spring element.

4. The diaphragm valve according to claim 1,
   wherein, in their respective second state, the drive subassembly and the pretensioning subassembly have a smaller longitudinal extent than in the first state.

5. The diaphragm valve according to claim 1,
   wherein the drive housing comprises an installation opening which enables access to an installation space of the drive housing
   wherein the drive subassembly in the first state and the pretensioning subassembly in the first state can be introduced into the installation space via the installation opening.

6. The diaphragm valve according to claim 5,
   wherein an internal cross section of the installation space tapers away from the installation opening, and
   wherein the pretensioning subassembly, in its second state, is supported on the tapering of the internal cross section.

7. The diaphragm valve according to claim 5,
   wherein the drive subassembly and the pretensioning subassembly are connected captively to one another for introduction into the drive housing.

8. The diaphragm valve according to claim 1, further comprising a valve spindle
wherein the drive housing comprises a first installation opening which is oriented away from the valve body and enables access to a first installation space section of the drive housing,
wherein the drive housing comprises a second installation opening which is oriented toward the valve body and enables access to a second installation space section of the drive housing,
wherein, in its first state, the drive subassembly can be introduced via the first installation opening into the first installation space section,
wherein, in its first state, the pretensioning subassembly can be introduced via the second installation opening into the second installation space section, and
wherein the first and second installation space sections are connected by means of a passage opening, through which the valve spindle is guided.

9. The diaphragm valve according to claim 1, further comprising a valve spindle and a control piston
wherein the valve spindle connected to the control piston of the drive subassembly is connected, guided by the pretensioning subassembly, to the diaphragm, and
wherein the pretensioning subassembly comprises a slide bearing, in which the valve spindle is guided.

10. The diaphragm valve according to claim 1,
wherein the pretensioning subassembly and the valve body engage in one another in such a manner that a rotation of the pretensioning subassembly with respect to the valve body about a feed axis is prevented.

11. The diaphragm valve according to claim 1,
wherein the drive housing comprises a first thread facing a valve body,
wherein the valve body comprises a second thread corresponding to the first thread.

12. The diaphragm valve according to claim 11,
wherein at least one of the first thread and the second thread is designed to be one of two-start or four-start.

13. The diaphragm valve according to claim 1,
wherein the drive subassembly comprises a control piston and a valve spindle firmly connected to the control piston,
wherein the control piston is supported by means of the first spring element, which is under pressure, on a spring plate,
wherein the valve spindle is passed through a passage opening of the spring plate,
wherein, on a side of the passage opening facing away from the control piston, the valve spindle comprises a first abutment area, and
wherein, in the first state of the drive subassembly, in collaboration with the first abutment area of the valve spindle, a second abutment area of the spring plate limits movement of the control piston away from the valve plate.

14. A diaphragm valve according to claim 1,
wherein the pretensioning subassembly comprises a counter-bearing section and a clamping section with a clamping area for clamping the diaphragm,
wherein the clamping section is supported by means of the second spring element, which is under pressure, on the counter-bearing section,
wherein the clamping section is passed in sections through a passage opening of the counter-bearing section,
wherein, on a side facing away from clamping area, the clamping section has a third abutment area, and
wherein, in the pretensioned state of the pretensioning subassembly, a fourth abutment area of the counter-bearing section, in collaboration with the third abutment area of the clamping section, limits movement of the clamping section away from the counter-bearing section.

* * * * *